(12) United States Patent
Chappell et al.

(10) Patent No.: US 7,011,131 B2
(45) Date of Patent: Mar. 14, 2006

(54) MOBILE BEAD BREAKER

(75) Inventors: Brett Chappell, New Market, AL (US); Charles Cross, Fayetteville, TN (US); Stephen Downs, Los Lunas, NM (US)

(73) Assignee: SUMMA Technology, Inc., Huntsville, AL (US)

( * ) Notice: Subject to any disclaimer, the term of this patent is extended or adjusted under 35 U.S.C. 154(b) by 0 days.

(21) Appl. No.: 10/324,313

(22) Filed: Dec. 18, 2002

(65) Prior Publication Data

US 2004/0118525 A1 Jun. 24, 2004

(51) Int. Cl.
*B60C 12/128* (2006.01)
(52) U.S. Cl. .................. 157/1.17; 157/1.2; 157/1.26
(58) Field of Classification Search ............. 157/1.1, 157/1.11, 1.17, 1.2, 1.26, 1.28, 1.22, 1.24, 157/14
See application file for complete search history.

(56) References Cited

U.S. PATENT DOCUMENTS

| | | | | |
|---|---|---|---|---|
| 2,893,478 A | * | 7/1959 | Crawford | 157/1.2 |
| 3,149,661 A | * | 9/1964 | Pardee | 157/1.2 |
| 3,160,196 A | * | 12/1964 | Ohlsen et al. | 157/1.17 |
| 3,850,221 A | * | 11/1974 | Zrostlik et al. | 157/1.33 |
| 3,972,363 A | * | 8/1976 | West et al. | 157/1.26 |
| 4,059,140 A | * | 11/1977 | Sedgwick | 157/1.17 |
| 4,102,380 A | * | 7/1978 | Holder | 157/1.26 |
| 4,226,275 A | * | 10/1980 | Robins | 157/1.2 |

* cited by examiner

*Primary Examiner*—Debra S Meislin
(74) *Attorney, Agent, or Firm*—Lanier Ford Shaver & Payne PC (57) ABSTRACT

A mobile bead breaker (100) may be provided comprising a pair of conjoined housings (102, 104). In a first of such housings (104) may be the control and drive mechanisms of the present invention including a pump, hydraulic ram (118), a vertical guide plate (114) and the apparatus' controls. In the second of such housings (102) may be located a supporting wall (122) and for smaller tires a positioning rod (126) for locating and then maintaining the tire/rim assembly in a stationary vertical position for engagement by the bead breaker mechanism. The bead breaker mechanism, additionally located within the second housing (102), may be a spider assembly (200) comprising a plurality of legs (202) equally spaced about a central hub (206). The central hub (206) of such spider assembly (200) may be mounted to the hydraulic ram (118). When the ram (118) is activated, the spider assembly (200) moves toward and engages the tire/rim assembly about the bead of the tire to break the rim/bead seal.

12 Claims, 8 Drawing Sheets

MOBILE BEAD BREAKER

STATEMENT OF GOVERNMENT INTEREST

The U.S. Government has a paid-up license in this invention and the right in limited circumstances to require the patent owner to license others on reasonable terms as provided for by the terms of U.S. Government Contract No. F33657-96-D-2009 awarded by the United States Air Force.

BACKGROUND OF THE INVENTION

1. Field of the Invention

This invention generally relates to tire changing equipment. In particular, the present invention relates to a mobile bead-breaking machine for separating a tire from its rim. More particularly, the present invention also relates to a mobile bead-breaking machine for separating an aircraft tire from its rim or wheel.

2. Background of the Invention

Tubeless pneumatic tires are mounted on wheels with rims that maintain an airtight seal between the tire and the rim. Bead breakers of various designs are used to break this airtight seal in order to remove or repair the tire. In order to de-mount a tire it must be separated from the tire rim at the seal, known as the bead, on the periphery of the tire and rim before the tire is forced away from the rim. Breaking the tire bead seal from the rim is a difficult task. Typically, the equipment operator is handling a heavy and unwieldy rim and tire.

Various devices have been conceived to break the bead of tires. In most cases, the devices are either large, stationary constructions or small hand held tools. There also exist specialized bead breakers for use with tires from particular modes of transportation. For instance, aircraft tires, which come in a variety of sizes, generally require specialized bead breakers. Military aircraft, particularly fighter aircraft, are frequently deployed to remote sites and there exists a need for a lightweight, easily transportable bead breaker that can operate under field conditions and service a number of different sizes and types of aircraft tires.

It is precisely because one of these devices does not exist that aircraft mechanics often resort to the use of the smaller, easier to handle hand tools that often damage or even destroy the tire in the mechanic's efforts to remove it from its rim. For example, mechanics often utilize a screwdriver and a hammer or even a crowbar in an attempt to break the tire bead. Use of such tools while likely posing the threat of damage to either the tire and/or the rim also poses dangers to the mechanics.

It is, therefore, desirable to provide a lightweight, easily transportable bead breaking apparatus capable of quickly, effectively and accurately acting upon a tire/rim assembly. Such apparatus should be able to break the bead of a tire without further damage to either the tire or its rim and should be capable of operating under field conditions and servicing a number of different sizes and types of aircraft tires.

SUMMARY OF THE INVENTION

The present invention recognizes and addresses various of the foregoing limitations and drawbacks, and others, concerning a mobile bead breaking machine for separating an aircraft tire from its rim or wheel. Therefore, the present invention is directed to such a device.

It is a principle object of the subject invention to provide a bead breaking apparatus. More particularly, it is an object of the present invention to provide a lightweight and easily transportable bead breaking apparatus. In such context, it is still a more particular object of the present invention to provide such a device specifically designed to handle bead breaking for aircraft tires, in particular fighter aircraft tires.

Still further, it is a principle object of this invention to provide a bead breaking apparatus capable of acting upon a number of different sizes and types of aircraft tires. It is a further object of the present invention to provide a bead breaking apparatus suitable for field deployment without unnecessary support equipment or calibration. In such context, it is an object of the present invention to provide a pneumatic tire bead breaker.

Additional objects and advantages of the invention are set forth in, or will be apparent to those of ordinary skill in the art, from the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

In one exemplary embodiment, there may be provided a mobile pneumatic aircraft tire bead breaker. Such bead breaking apparatus may be adjustable to service a wide range of tire sizes. Additionally, it may be self-contained and relatively lightweight with a compact form factor making it particularly suitable for deployment to remote sites. Further, it may primarily comprise simple components that are easily replaceable or repairable thus ensuring its ease of maintenance and reliability.

The bead breaking apparatus may be generally comprised of a pair of conjoined box-like housings resting on a wheeled base. The first box-like housing may harbor the driving mechanisms of the present invention, including a pump, hydraulic ram, tubing and the controls for the apparatus. The second box-like housing may contain a spider assembly, that portion of the apparatus that engages the tire to effect its removal from the rim.

Within the second housing may be located a positioning rod for engagement with a tire and rim assembly requiring repair. Such positioning rod could serve to properly align such a tire and rim assembly with the spider assembly. Still further, it may maintain the assembly vertical against a support wall. The spider assembly, a plurality of legs equally spaced about a central hub, each leg further comprising an engagement member, may be located within the second housing as well.

Such spider assembly may lie generally in plane parallel to such support wall. A hydraulic ram, operating in a plane generally perpendicular to the plane of the spider assembly, may be used to force the spider assembly toward the tire and rim assembly. The spider assembly may engage the tire and rim assembly with its engagement members at a point slightly outside the rim (i.e., at the bead of the tire). The hydraulic force behind the spider assembly may operate to break the airtight seal between the tire and rim to effectively release the tire therefrom. The tire may then be reversed so as to break the tire's bead on the opposing side thereof.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to present the preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

As disclosed above, the present invention is particularly concerned with a mobile bead-breaking machine 100 for separating an aircraft tire from its rim or wheel. As seen in the various views of FIGS. 1–5, the present invention comprises a pair of conjoined box-like housings 102 and 104 atop a wheeled base 106.

The base 106 may be provided with a ramp 108 for use with larger tires to aid in getting them into the apparatus 100. The ramp 100 is hinged to an outer edge of the base 106 but may be stowed entirely within the footprint of the base 106 during storage or transport of the apparatus 100. To enhance the portability of the apparatus 100, the base 106 has been supplied with channels 110 for the receipt of the forks on a forklift. Such channels generally run fore to aft on the apparatus to allow for the forklift operator to ensure the device has been properly secured for transport. To enhance the structural stability of the apparatus 100, a stiffener 111 may be added between the channels 110. Finally, the base 106 may be provided with free rotation casters 112. The casters 112 may further be provided with locking means 113 to hold the apparatus 100 in place during operation.

The first housing 104 harbors all of the driving mechanisms and controls for the apparatus 100. Compressed air from an outside source (not shown) is used to generate hydraulic pressure. The pressure is used to drive a hydraulic ram 118 including a piston 120. The hydraulic ram 118 and thus the piston 120 may be vertically aligned by way of its connection to a sliding plate 114, which rides on a threaded rod 124. A piano screw or the like may be used for the threaded rod 124. The sliding plate 114 may serve as the divider between the housings 102 and 104. The hydraulic ram 118 and piston 120 pass through the sliding plate 114 by way of an opening 116 therein.

The second housing 102 may include the extended piston 120 of the hydraulic ram 118. At the end of the piston 120 is a spider assembly 200. A positioning rod 126 for vertical positioning of smaller tire and rim assemblies may also be included therein. Such a positioning rod 126 would be located in the supporting wall 122 and would act to secure the tire and rim assembly in position during the bead breaking process. Due to the limited vertical range of motion of the spider assembly 200, the use of such a positioning rod 126 is required to enable the apparatus 100 to properly align with the tire/rim assembly. Such positioning rod 126 further enhances the range of tire sizes serviced by the present invention.

Figure 1:
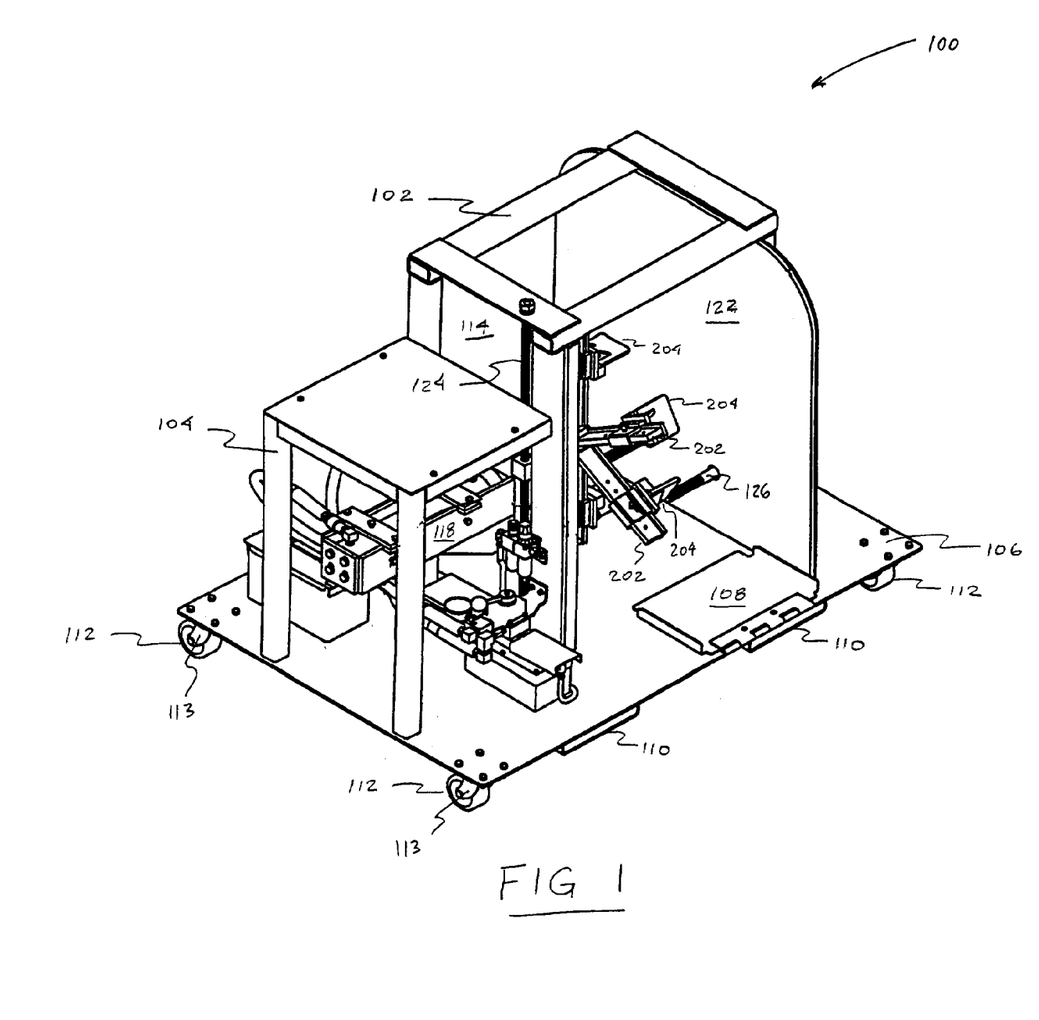
FIG. 1 is a perspective view of the present invention.
Figure 2:
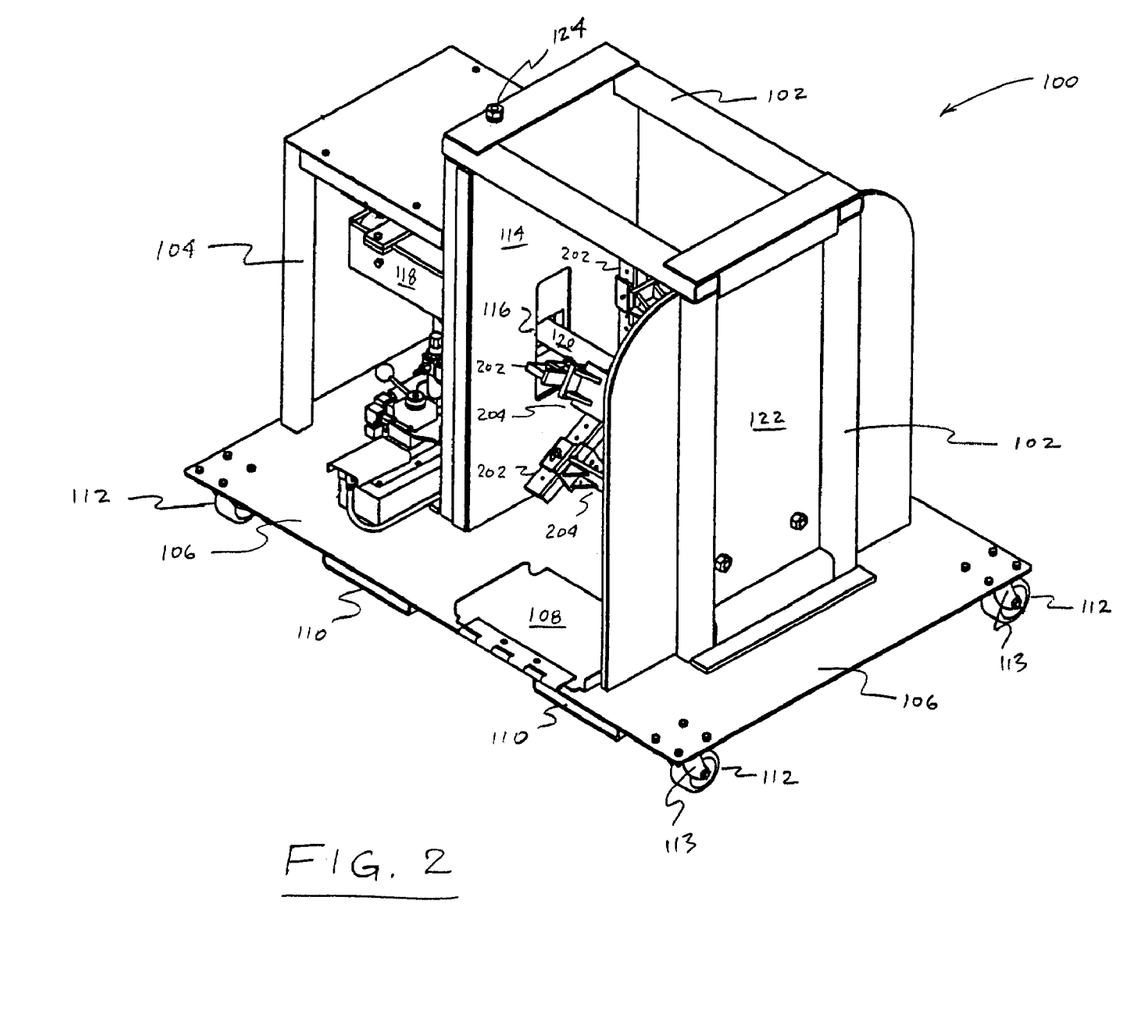
FIG. 2 is a second perspective view of the embodiment of the present invention depicted in FIG. 1.
Figure 3:
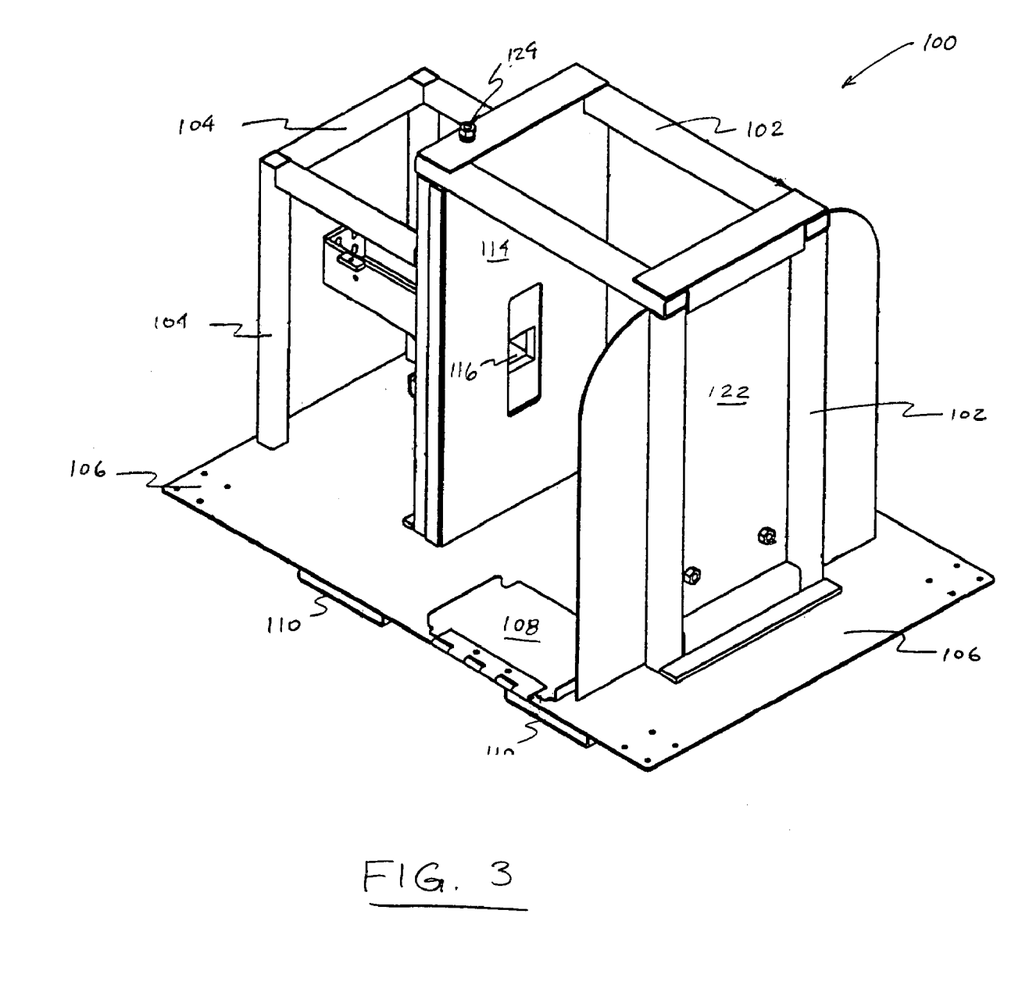
FIG. 3 is a perspective view of the frame of the present invention resting on the base of the present invention without any of the functional components of the apparatus.
Figure 4:
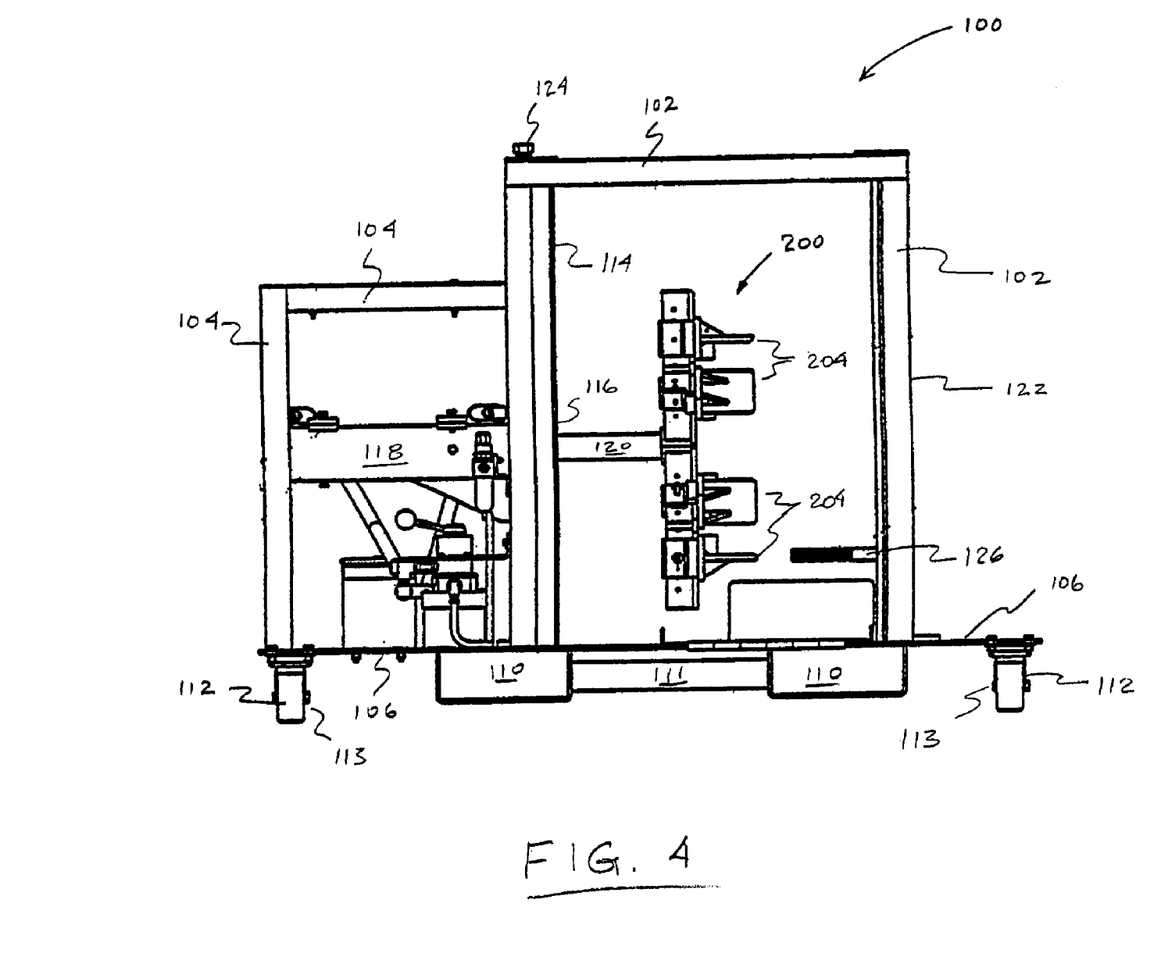
FIG. 4 is a front view of one embodiment of the present invention depicting the hydraulic ram means and the spider assembly for interaction with an aircraft tire.
Figure 5:
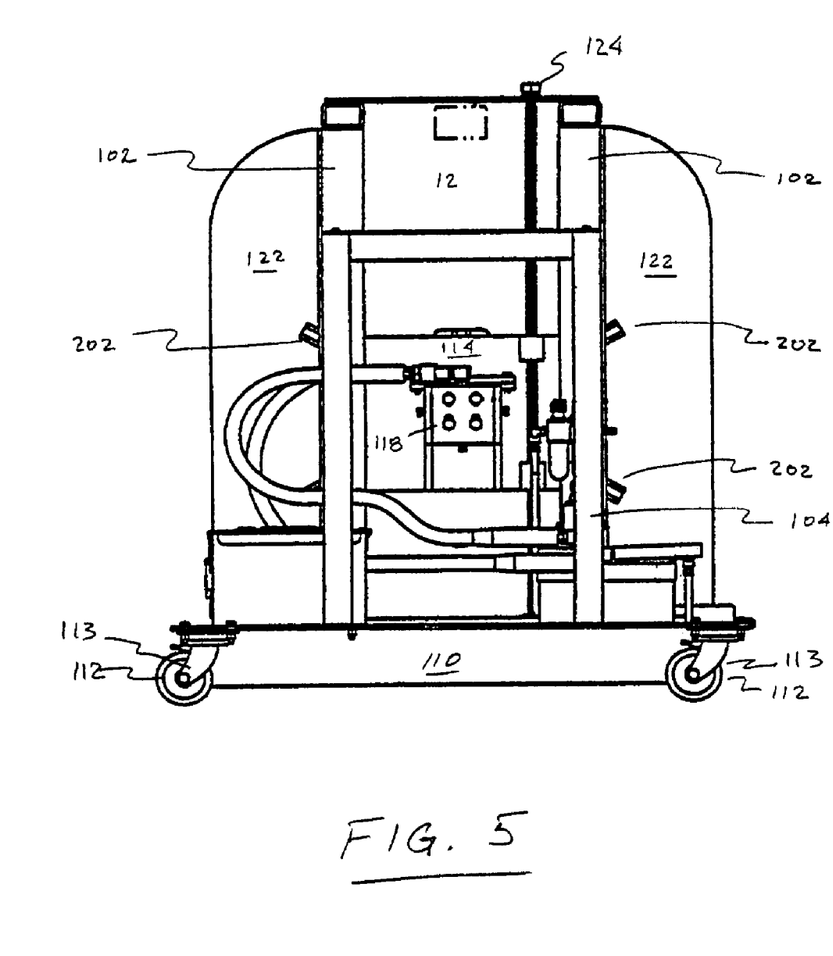
FIG. 5 is a side view of the embodiment of the present invention depicted in FIG. 4, showing the control and actuating means.
Figure 6:
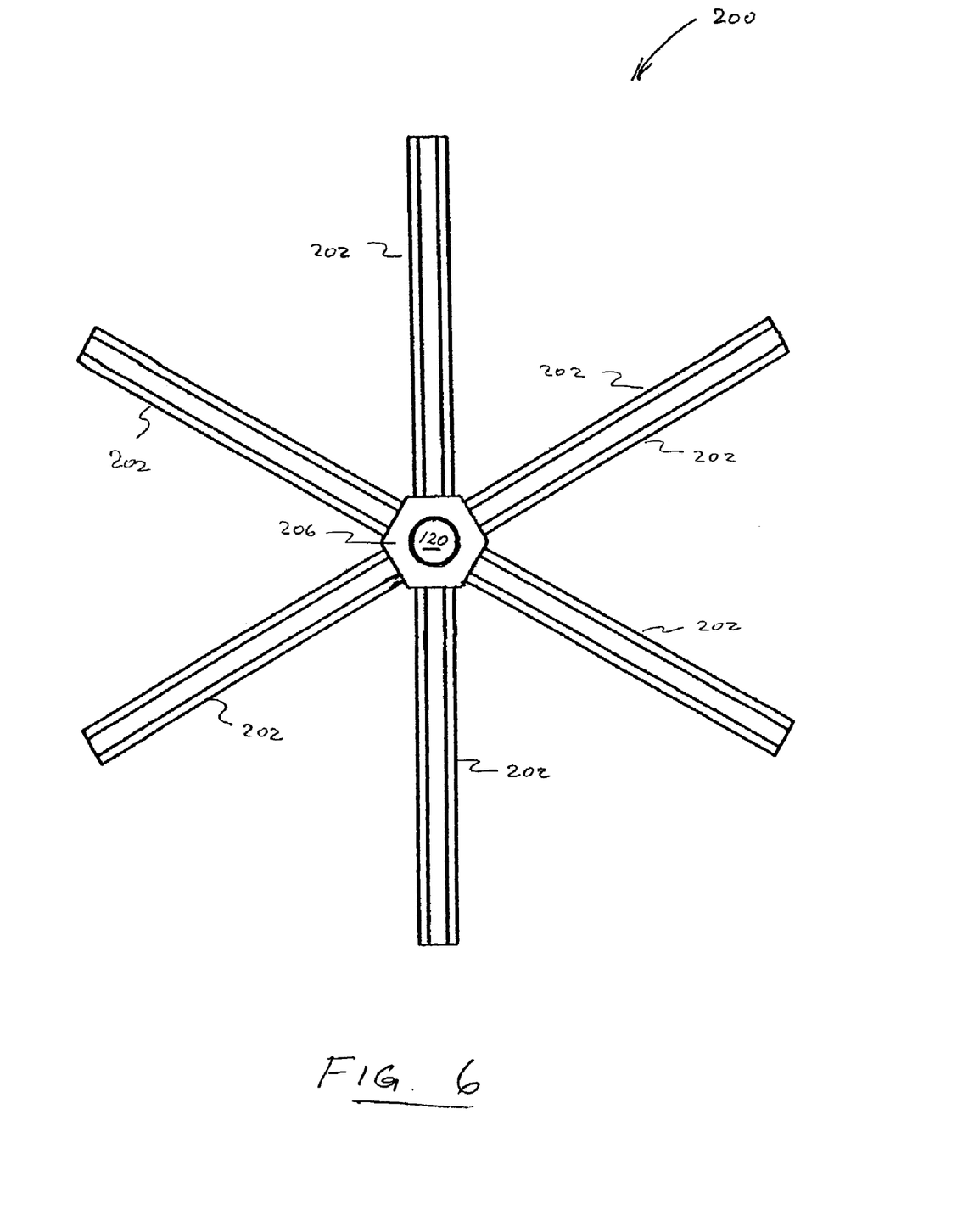
FIG. 6 is an orthogonal view of the base of the spider assembly.
Figure 7:
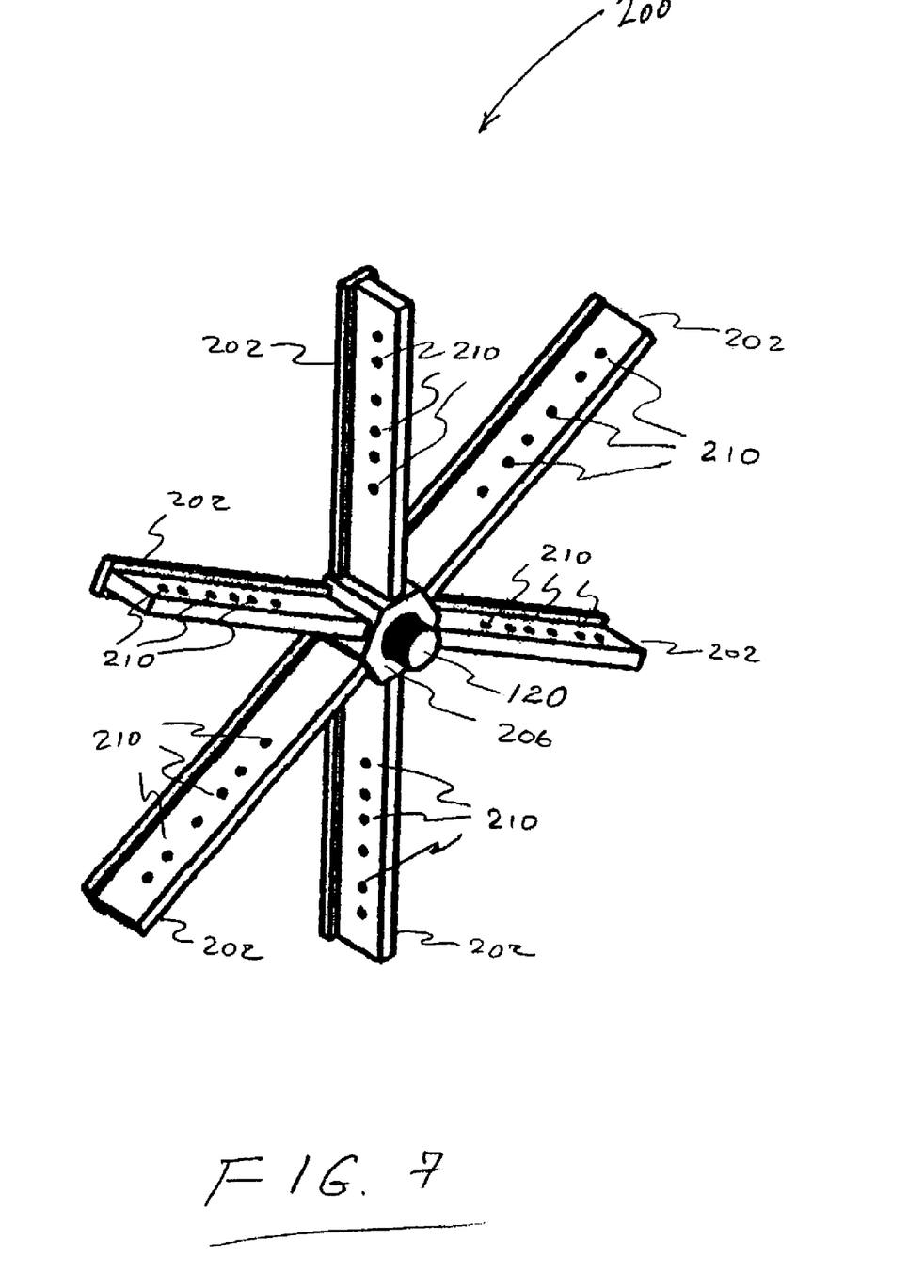
FIG. 7 is a perspective view of the base of the spider assembly shown in FIG. 6.

As can be seen in FIGS. 1–5 and particularly in FIG. 6 and 7, the spider assembly 200 comprises a plurality of legs 202 extending outwardly from a central hub 206 connected to the hydraulic piston 120. At various predetermined locations along the length of each leg are holes 210. These holes are for receiving positioning engagement members 204 (as seen FIGS. 1–5) located on each leg 202.

Figure 8:
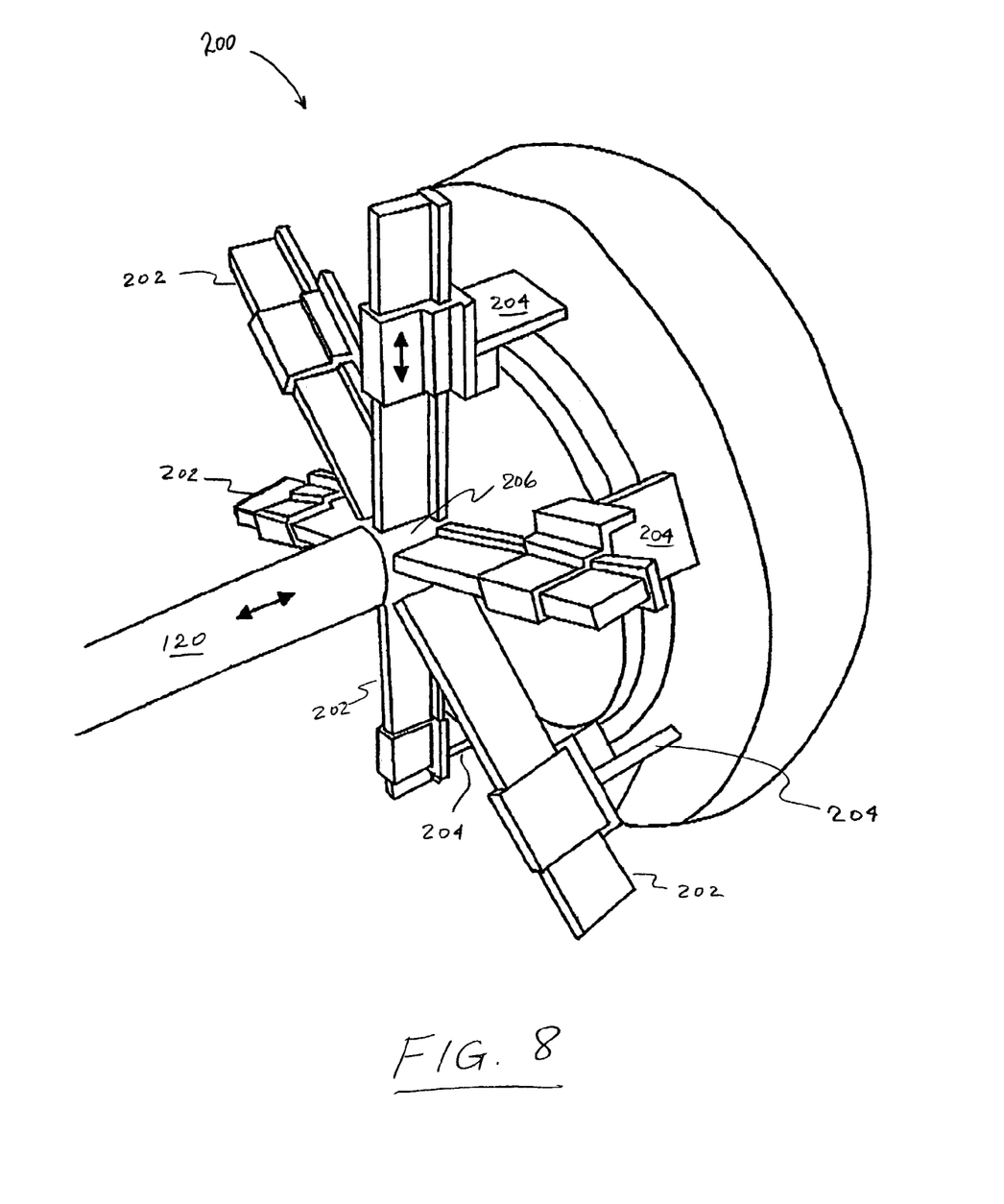
FIG. 8 is a perspective view of the spider assembly with engagement members actively engaging a tire bead for removal of the tire from its rim.

As can best be seen in FIG. 8, the engagement members 204 may be moved along the legs 202 to any of the predetermined positions to accommodate a wide variety of tire and rim sizes. Each engagement member 204 is provided with a securement means for maintaining the member 204 in place during the operation of the apparatus 100. Any known securement means sufficient to withstand the forces acting on the engagement members 204 during the bead breaking process will suffice. For example, such securement means may include, but are not limited to, a ball-lock for engagement with the holes 210, a securing pin for passage through said holes 210, a nut and bolt configuration or any combination thereof.

The spider assembly 200 is removeably attached to the hydraulic piston 120 via its central hub 206. As seen in FIG. 6 and 7, in a preferred embodiment the central hub 206 is hexagonally shaped. As such, permanent affixation of the legs 202 both to the hub and at a desirable angle may be achieved. The central hub 206 may be threaded for attachment to the piston 120. It should be noted that while in the preferred embodiment of the present invention the spider assembly 200 has six legs 202 and a hexagonal central hub, any number of legs 202 and any shape of central hub may be included in such assembly 200.

In use, the present invention provides for a tire and rim assembly to be placed within the second housing 102 against the supporting wall 122 in a vertical orientation. For smaller tires and landing gear assemblies, such as nose gear assemblies, a positioning rod 126 may be used to properly orient the tire vertically. The horizontal positioning of the tire/rim assembly is a responsibility of the apparatus operator. Such horizontal alignment is generally done by eye. Prior to the positioning of the tire, the spider assembly 200 is adjusted to properly accord with the type of aircraft tire that is undergoing work. While the present invention is specifically designed to handle landing gear assemblies from the U.S. F-16 and F-22 fighter aircraft, simple modifications may be made to accommodate tires from almost any aircraft.

In setting the spider assembly 200 the engagement members 204 are adjusted to contact the tire just beyond the outer edge of the rim. The hydraulic ram 118 is used to drive the piston 120 and spider assembly 200 into the tire bead and break the rim/bead seal. The tire is then reversed and the process is repeated on the tire's opposing side.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. A mobile tire bead breaking apparatus, comprising:
    a wheeled support base including a first housing and a second housing, said first and second housing being separated by a sliding wall with an opening therein;
    a hydraulically-driven spider assembly, said spider assembly comprising a plurality of legs extending outward from a central hub, wherein each of said plurality of legs further includes an engagement member;
    individual adjustment means for adjusting the position of each of said engagement members along the length of their respective one of said plurality of legs;
    hydraulic means for driving said spider assembly forward and forcing engagement with a tire requiring repair to effectuate the breaking of said tire's bead at at least one position about the rim of said tire; and
    wherein said spider assembly is affixed to a first end of a hydraulic piston driven by said hydraulic means through said opening in said sliding wall.

2. A mobile tire bead breaking apparatus, comprising:
    a frame affixed to a mobile base, said frame including a first housing and a second housing, said first and second housings being separated by a sliding wall with an opening therein;
    a spider assembly comprising a plurality of legs extending outward from a central hub, each of said legs further includes an engagement member;
    means for adjusting said engagement member's position along the length of each of said engagement member's respective one of said plurality of legs;
    hydraulic means for driving said spider assembly toward and forcing engagement with a tire requiring repair to effectuate breaking of said tire's bead at at least one position about the rim of said tire and wherein said hydraulic means includes a piston, said piston extending from said first housing through said opening and into said second housing; and
    wherein said spider assembly is affixed to an end of said piston in said second housing.

3. The mobile tire bead breaking apparatus as in claim 1, wherein said spider assembly and hydraulic means are vertically adjustable to accommodate multiple sized tires.

4. The mobile tire bead breaking apparatus as in claim 3, wherein said vertical adjustment is accomplished using a threaded rod.

5. The mobile tire bead breaking apparatus as in claim 3, further comprising a positioning rod, wherein said positioning rod is used to aid in maintaining smaller tires in place during operation of said apparatus.

6. The mobile tire bead breaking apparatus as in claim 1, wherein said engagement members are removably attached to their respective one of said plurality of legs.

7. The mobile tire bead breaking apparatus as in claim 2, wherein said spider assembly and hydraulic means are vertically adjustable to accommodate multiple sized tires.

8. The mobile tire bead breaking apparatus as in claim 7, wherein said vertical adjustment is accomplished using a threaded rod.

9. The mobile tire bead breaking apparatus as in claim 7, further comprising a positioning rod, wherein said positioning rod is used to aid in maintaining smaller tires in place during operation of said apparatus.

10. The mobile tire bead breaking apparatus as in claim 2, wherein said engagement members are removably attached to their respective one of said plurality of legs.

11. A method for breaking a tire bead, comprising the steps of:
    positioning a tire within a bead breaking apparatus, said apparatus comprising:
        a frame having a first and second housing, said first and second housing being separated by a sliding wall with an opening therein and said fame being affixed to a mobile base,
        a spider assembly comprising a plurality of legs extending outward from a central hub, wherein each of said legs further includes an engagement member,
        means for adjusting the position of each respective one of said engagement members along the length of its respective one of said plurality of legs, and
        hydraulic means;
    adjusting said spider assembly and said hydraulic means vertically within said frame, said vertical adjustment being achieved through movement of said spider assembly and said hydraulic means along a threaded rod;
    adjusting each of said engagement members for interaction with the bead of said tire; and
    initiating said hydraulic means from said first housing so as to effectuate the movement of said spider assembly in said second housing towards said tire and causing the breaking of said tire bead at at least one location about the rim of said tire.

12. The method of breaking a tire bead as in claim 11, wherein said engagement members are removably attached to their respective one of said plurality of legs.

* * * * *